United States Patent [19]
Hanna

[11] Patent Number: 5,007,655
[45] Date of Patent: Apr. 16, 1991

[54] VARIABLE SPEED LEVER PROPELLED WHEELCHAIR

[76] Inventor: Mark Hanna, 2813 Bunch Walnuts Rd., Chesapeake, Va. 23322

[21] Appl. No.: 461,425

[22] Filed: Jan. 5, 1990

[51] Int. Cl.[5] ................................................ B62M 1/16
[52] U.S. Cl. ................................ 280/250.1; 280/245; 280/254; 74/109; 74/131
[58] Field of Search ..................... 280/242.1, 244, 245, 280/247, 249, 250.1, 254, 11.115; 74/109, 130, 131, 89.17, 422; 192/20; 474/206, 210, 212

[56] References Cited

U.S. PATENT DOCUMENTS

| | | | |
|---|---|---|---|
| 926,131 | 6/1909 | McGowan | 280/245 |
| 1,276,168 | 8/1918 | Buchholz | 280/245 |
| 3,994,509 | 11/1976 | Schaeffer | 280/242 |
| 4,354,691 | 10/1982 | Saunders et al. | 280/250.1 |
| 4,453,729 | 6/1984 | Lucken | 280/242 |
| 4,538,825 | 9/1985 | Delahoussaye et al. | 280/250.1 |
| 4,560,033 | 12/1985 | DeWoody et al. | 280/250.1 |
| 4,727,965 | 3/1988 | Zach et al. | 192/6 |
| 4,762,332 | 8/1988 | Seol | 280/242 |
| 4,811,964 | 3/1989 | Horn | 280/250 |
| 4,840,076 | 6/1989 | Brubaker et al. | 280/250.1 |

*Primary Examiner*—Charles A. Marmor
*Assistant Examiner*—Mitchell Bompey
*Attorney, Agent, or Firm*—Nixon & Vanderhye

[57] ABSTRACT

Disclosed is a wheelchair having a pair of levers along its opposite sides connected with sprockets on drive wheels. In one form, each lever is connected to its sprocket by a rack. The drive wheels have a clutch enabling the power stroke of the lever to drive the wheels through the rack-and-pinion engagement, yet permitting the sprocket to rotate in the reverse direction freely upon the return stroke of the lever. The rack includes an arcuate extent void of teeth to enable disengagement of the drive connection between the lever and sprocket whereby the wheels may move freely in either direction. In another form, a chain interconnects the lever and a return spring connected to the wheelchair frame. The chain has an extent void of pins to enable disengagement of the drive connection between the lever and sprocket, whereby the sprocket and, hence, drive wheel are free to rotate in either direction. A speed change mechanism is employed to vary the torque applied to the sprocket by the lever.

13 Claims, 3 Drawing Sheets

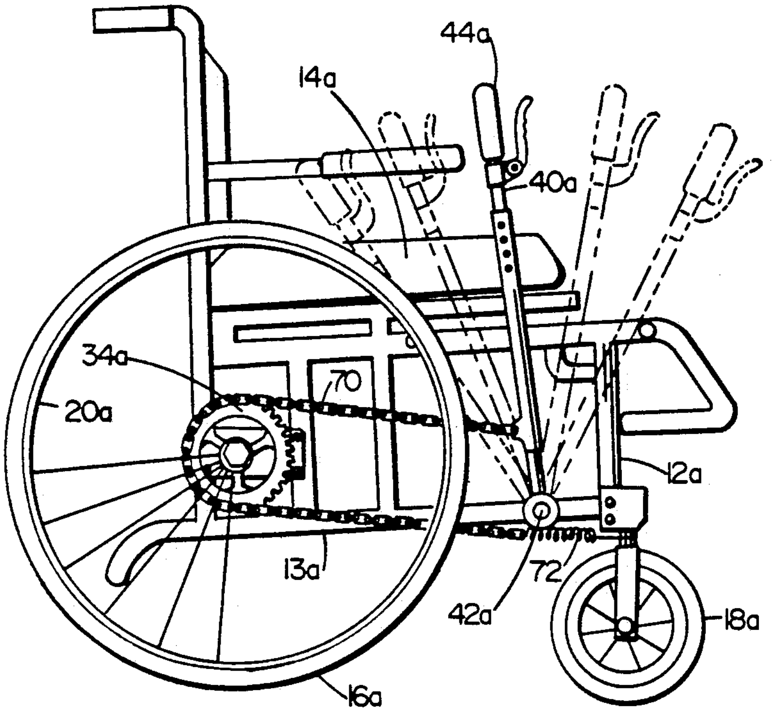
FIG. 4
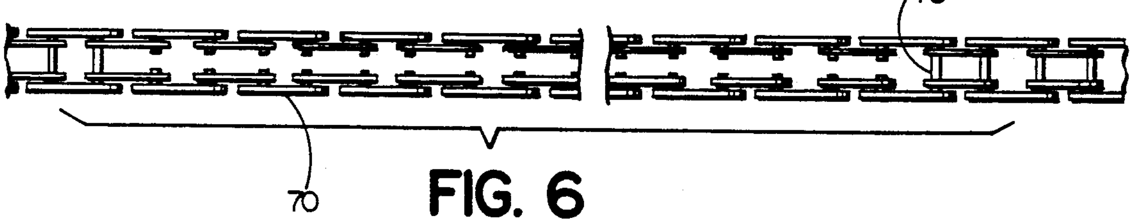
FIG. 6
FIG. 5
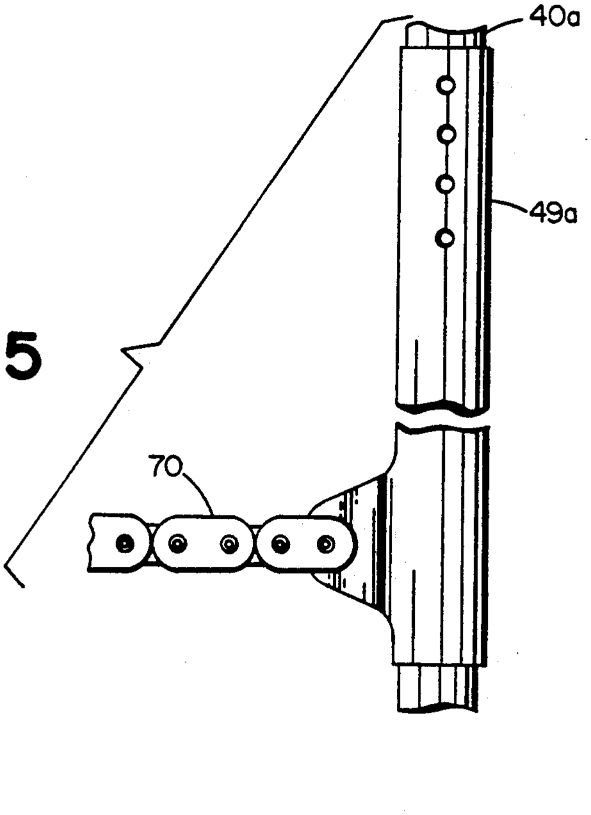

VARIABLE SPEED LEVER PROPELLED WHEELCHAIR

BACKGROUND OF THE INVENTION

1. Field of the Invention

The present invention relates to a wheelchair which may be propelled by the individual seated in the chair and particularly relates to a wheelchair having a pair of pivoted levers along opposite sides of the chair movable by the seated individual to provide a power stroke to the wheels to propel the wheelchair in a forward direction.

2. Discussion of Prior Art

As well known, a conventional wheelchair has a pair of large rear wheels on its opposite sides and smaller casterable wheels adjacent the footrest at the front of the wheelchair. Typically, the wheelchair is propelled by the individual seated in the chair using push rims, i.e., circular rims generally concentric with, but projecting outwardly from, the large wheels. The individual grasps the push rims and rotates the wheels in either direction to propel the wheelchair in either forward or reverse directions or differentially to turn the wheelchair. That is, by rotating one wheel faster than the other, or maintaining one wheel stationary while rotating the other, directional movement may be obtained.

Many and various proposals have been made to facilitate the propulsion of a wheelchair by a pumping or rowing action by the individual seated in the chair. Bicycle-type drive mechanisms, for example, have been proposed, as well as a large variety of other mechanisms to gain the mechanical advantages afforded by these mechanisms. However, many such mechanisms suffer from the disadvantages of complexity and expense and have not, to applicant's knowledge, been adopted in commercial applications.

An example of the above is U.S. Pat. No. 4,453,729, issued June 12, 1984, which discloses a wheelchair employing a pair of levers at opposite sides of the chair which engage and disengage cables about a clutching mechanism associated with the wheels. The drive mechanism employs a sleeve swaged onto the cable to engage a drive disc, as well as a ratchet and pawl arrangement to permit free wheeling in both directions and rearward movement of the wheelchair. This type of arrangement, however, is quite complicated, expensive to manufacture, and does not afford a variable speed mechanism.

Other proposals have employed levers interconnected to ratchet mechanisms connected to the wheels by means of rods. In one such system, the speed of the wheelchair may be varied by repositioning the rods at different points of connections with the levers. This is exemplified in U.S. Pat. No. 4,762,332 to Seol. See also U.S. Pat. Nos. 3,994,509; 4,811,964 and 4,727,965 for additional types of manual driving mechanisms for wheelchairs.

SUMMARY OF THE INVENTION

In accordance with the present invention, there is provided a novel and improved wheelchair wherein a lever-type action is used by the individual seated in the wheelchair to provide a power stroke to rotate the wheels and, hence, locomotion of the wheelchair in a forward direction, and a return stroke in which the wheels are de-clutched from the levers. There is also provided an interconnection between the levers and the drive wheels for the wheelchair which enables the drive connection between the levers and wheels to be disconnected. This permits manual movement of the wheels in either direction, for example, by using the conventional push rims, and hence movement of the wheelchair in a rearward direction. Additionally, the present invention affords means for varying the torque applied to the drive wheels and which torque varying means can be selectively adjusted by the individual seated in the wheelchair from a location adjacent the position where the individual grasps the levers to propel the wheelchair.

Furthermore, the present invention permits the wheels to over-rotate in the forward direction. The interconnection between the levers and wheels have a null or neutral position within the range of movement of the levers enabling the drive between the wheels and levers to be disconnected whereby the wheelchair may be manually propelled by the conventional push rims, for example, in a rearward direction. Thus, when the wheelchair is moving forwardly at a speed greater than the driving speed, for example, when moving down an incline, and also when the wheelchair is moved in a rearward direction, the drive mechanism is effectively disconnected such that the rotating wheels do not reverse drive and pump the levers. Other advantages and benefits of the present wheelchair will become apparent upon reference to the following specification.

In a particular embodiment of the present invention, there is provided a wheelchair having a pair of rear drive wheels, a pair of front casterable wheels and a pair of levers adjacent opposite sides of the wheelchair for driving the drive wheels to propel the wheelchair in a forward direction. More particularly, in one preferred embodiment of the present invention, each drive wheel is coupled to a sprocket through a one-way clutch mechanism which, upon rotation of the sprocket in a direction to propel the wheelchair forwardly, engages the drive wheel hub to rotate the drive wheel. The clutch mechanism is such that over-running of the drive wheel is permitted. A handbrake is normally used in conjunction with one or both of the levers to brake the wheelchair. Thus, in a preferred embodiment, levers on opposite sides of the wheelchair may be pushed forwardly, preferably in unison, by the individual seated in the wheelchair to provide power strokes to drive the sprockets and associated drive wheels in a direction to propel the wheelchair in a forward direction. Upon the return strokes, the sprockets are de-clutched from the wheel hubs and rotate in a reverse direction about the wheel hubs.

In a significant aspect of the present invention, for the interconnection between each lever and its associated sprocket, a neutral or null position is provided whereby the sprocket is disengaged from driving connection with the lever, enabling the wheels to be freely rotated in either direction. In this manner, the wheels may be rotated in either direction, for example, to move the wheelchair in a rearward direction without pumping or reverse driving the levers. In one preferred embodiment, the lever is interconnected to the sprocket by means of a rack. Preferably, the rack has a plurality of teeth along a first extent thereof for engaging and driving the sprocket in a forward direction. The rack also has a second extent which is devoid of drive teeth. This enables the sprocket and rack to remain engaged but in non-driving relation. In this manner, the wheels are effectively disengaged from the lever drive mechanism and can be moved in either direction by use of the conventional push rims.

Additionally, the torque applied to the sprockets upon movement of the levers through their power strokes may be selectively varied by the individual seated in the wheelchair. For each drive mechanism, this is accomplished by selectively adjusting the pivotal connection between the rack and lever in opposite directions along the lever, thus effectively changing the length of the lever arm. For example, the rack may be pivotally coupled to a tube slidable along the lever between selected adjusted positions by a mechanism accessible to the seated individual adjacent the handle of the lever. In this manner, the power stroke delivers selected torque to the sprocket depending upon the location of the pivotal connection between the rack and lever along the lever.

In a second embodiment hereof, each lever and associated sprocket are interconnected by means of a chain. The chain is pivotally connected at one end to the lever, is disposed about the sprocket and terminates at its opposite end secured to a coil spring fixed to the frame. In this manner, the forward motion of the lever causes the chain to rotate the sprocket in the forward direction, clutching the wheel and, hence, driving the wheelchair in the forward direction. To disengage the chain from the sprocket and, hence, permit rotation of the wheel in either direction, e.g., rearward movement of the wheelchair without reverse driving the lever, an extent of the chain is formed void of the links which comprise longitudinally spaced pins which engage the sprocket teeth. Thus, upon positioning the lever to engage the extent of the chain void of pins with the sprocket, the sprocket is free from driving connection with the chain and, thus, the wheel is enabled for rotation in either direction. As in the prior embodiment, the torque applied by the chain to the sprocket can be varied by movement of the pivotal connection between the chain and the lever along the lever into selected adjusted positions.

In a preferred embodiment according to the present invention, there is provided a manually-propelled wheelchair comprising a wheelchair frame having a seat for supporting an individual, means supporting the frame for locomotion of the wheelchair including a pair of wheels carried by the frame adjacent opposite sides thereof and means for mounting the wheels for rotation relative to the frame. Means are carried by the frame and operable by the individual seated in the wheelchair for propelling the wheelchair in a forward direction, including at least one lever pivotally connected to the frame, a rotatable drive sprocket carried by the frame for rotating at least one of the wheels in a direction to propel the wheelchair in a forward direction, and means interconnecting the lever and the sprocket for rotating the drive sprocket to propel the wheelchair in the forward direction. These interconnecting means include an elongated rack connected to the lever for substantially translational movement in response to pivotal movement of the lever. The rack carries a plurality of teeth, the teeth in a first position of the rack relative to the sprocket engaging and driving the sprocket in response to pivoting the lever and translating the rack to propel the wheelchair in the forward direction, the rack in a second position relative to the sprocket enabling non-driving relative movement between the sprocket and the rack, thereby disconnecting the drive connection between the lever and the sprocket and freeing the one wheel for rotation to move the wheelchair in a rearward direction.

In a further preferred embodiment according to the present invention, there is provided a manually propelled wheelchair comprising a wheelchair frame having a seat for supporting an individual, means supporting the frame for locomotion of the wheelchair including a pair of wheels carried by the frame adjacent opposite sides thereof, means for mounting the wheels for rotation relative to the frame. Means are carried by the frame and operable by the individual seated in the wheelchair for propelling the wheelchair in a forward direction, including at least one lever pivotally connected to the frame, a rotatable drive sprocket carried by the frame for rotating at least one of the wheels in a direction to propel the wheelchair in a forward direction and means interconnecting the lever and the sprocket for rotating the drive sprocket to propel the wheelchair in the forward direction. The interconnecting means include a chain having a plurality of longitudinally spaced, transversely extending, pins in a first predetermined extent thereof in the chain for engaging the teeth of the sprocket thereby to drive the sprocket and to propel the wheelchair in a forward direction, the chain having a second extent thereof void of pins and engageable with the sprocket, enabling non-driving relative movement between the sprocket and the chain, thereby disconnecting the drive connection between the chain and the sprocket and freeing the one wheel for rotation to move the wheelchair in a rearward direction.

In a still further embodiment according to the present invention, there is provided a manually-propelled wheelchair comprising a wheelchair frame having a seat for supporting an individual, means supporting the frame for locomotion of the wheelchair including a pair of wheels carried by the frame adjacent opposite sides thereof and means for mounting the wheels for rotation relative to the frame. Means are carried by the frame and operable by the individual seated in the wheelchair for propelling the wheelchair in a forward direction, including at least one lever pivotally connected to the frame, a rotatable drive sprocket carried by the frame for rotating at least one of the wheels in a direction to propel the wheelchair in a forward direction. Means are provided for interconnecting the lever and the sprocket for rotating the drive sprocket to propel the wheelchair in the forward direction, the interconnecting means including an element movable through two positions relative to and in engagement with the sprocket, the element in the first position thereof relative to the sprocket engaging and driving the sprocket, the element in the second position thereof relative to the sprocket engaging the sprocket in non-driving relation thereto thereby disconnecting the drive connection between the lever and the sprocket and freeing the one wheel for rotation.

Accordingly, it is a primary object of the present invention to provide a novel and improved wheelchair having levers pivotal on power strokes to propel the wheelchair in a forward direction, the speed of which can be variably selected, and which levers can be disengaged from the drive wheels to enable movement of the wheels in either direction by ancillary means.

These and further objects and advantages of the present invention will become more apparent upon reference to the following specification, appended claims and drawings.

BRIEF DESCRIPTION OF THE DRAWING FIGURES

FIG. 4 is a view similar to FIG. 1 illustrating a further embodiment of the present invention;

FIG. 5 is an enlarged fragmentary side elevational view illustrating the manner in which the speed change or variable torque is obtained;

FIG. 6 is a fragmentary enlarged bottom plan view of the chain extending between the sprocket and spring in FIG. 4;

DETAILED DESCRIPTION OF THE DRAWING FIGURES

Reference will now be made in detail to the present preferred embodiment of the invention, an example of which is illustrated in the accompanying drawings.

Figure 1:
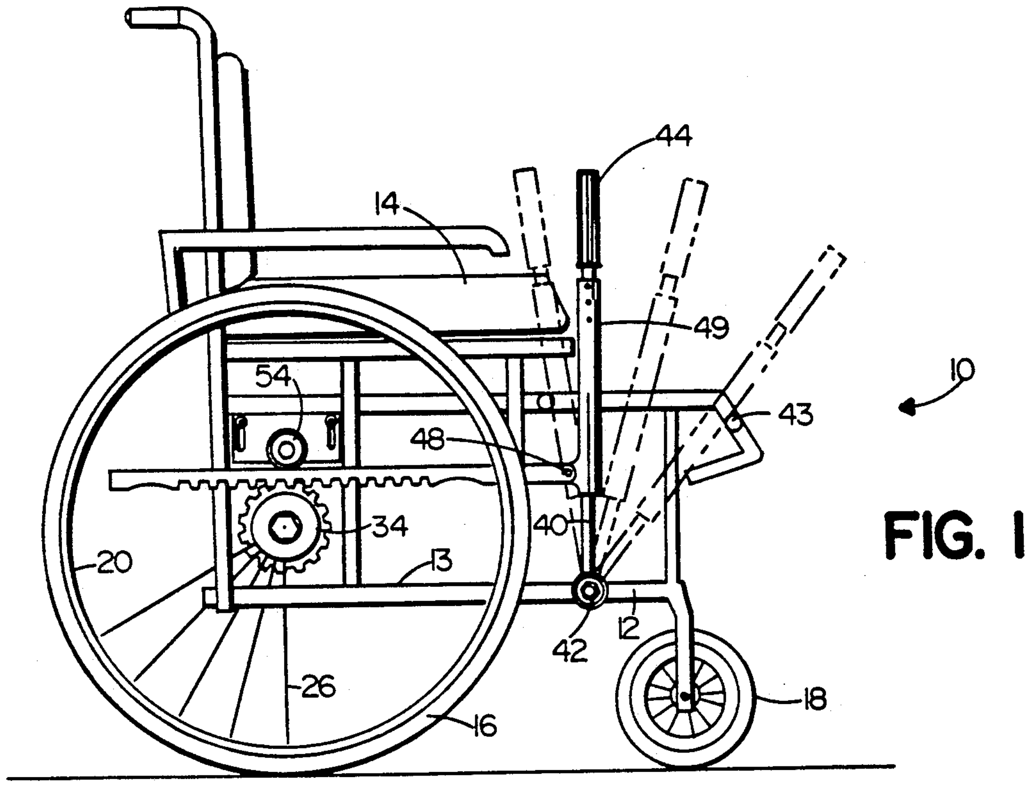
FIG. 1 is a side elevational view of a wheelchair constructed in accordance with the present invention.

Referring now to the drawings, particularly to FIG. 1, there is illustrated a wheelchair, generally designated 10, constructed in accordance with the present invention. Wheelchair 10 includes a frame 12 which may be formed of tubular metal members welded together to form a pair of side support frames 13 interconnected by suitable cross-frame members, not shown, to provide a seat 14 on which an individual may be seated when using the wheelchair 10. The frame 12 may therefore be of conventional construction and may be of the type permitting the cross-frame members to be articulated such that the side frames 13 are movable toward one another to provide a storage position. Such constructions are well known in the art and further description of that type of construction is not believed necessary. Suffice to say, frame 12 of wheelchair 10 may be conventional or otherwise except to the extent of the mechanism providing locomotion, which will be described. Wheelchair 10 also includes a pair of rear drive wheels 16, each adjacent an opposite side frame of wheelchair 10, and a pair of smaller casterable front wheels 18 disposed adjacent the forward end of wheelchair 10, i.e., adjacent the chair's footrest, not shown. Wheelchair 10 is preferably provided with conventional push rims 20 mounted concentrically with the drive wheel 16 for purposes which will become clear from the ensuing description.

Figure 2:
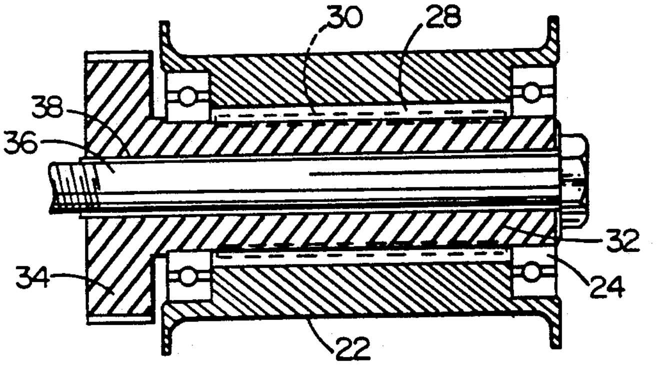
FIG. 2 is an enlarged cross-sectional view illustrating the sprocket and clutch mechanism for each of the drive wheels.

Referring now to FIG. 2, each drive wheel 16 is provided with a hub 22, the hub providing the mounting points for spokes 26 of drive wheels 16. A sleeve 28 is secured within the hub 22 and carries a plurality of clutch elements 30 for clutching engagement with a hub 32 of sprocket 34 depending on the direction of relative rotation of the hubs 22 and 32. The clutch mechanism is conventional and may be of the type manufactured by the Torrington Company, known as the Torrington DC Clutch. Suffice to say that rotation of sprocket 34 in a direction corresponding to the direction of rotation of drive wheel 14 to move the wheelchair forwardly clutches the sprocket hub 32 to sleeve 28 and, hence, the wheel hub 22 such that the sprocket and wheel hub rotate unitarily in a forward direction. The clutch permits rotation of hub 22 of drive wheel 16 in a forward direction faster than hub 32 of sprocket 34. It will also be appreciated that rotation of sprocket 34 in the opposite direction permits its hub 32 to rotate freely relative to the wheel hub 22 by virtue of the de-clutching action therebetween. Each sprocket and wheel hub sub-assembly is mounted on frame 12 by a bolt 36 connected to frame 12 and passing through a sleeve 38 in the bore of hub 32.

To propel wheelchair 10 in a forward direction in accordance with the present invention, a lever 40 is provided adjacent each side frame 13 of wheelchair 10. Each lever 40 upstands from a pivotal connection 42 at its lower end with side frame 13 and terminates at its upper end in a handle grip 44 accessible by an individual seated in wheelchair 10 for reciprocating movement about pivot 42, for example, through the various solid and dashed-line positions of lever 40 illustrated in FIG. 1. Stops 43 are provided on each side frame at the extreme range of pivotal movement of lever 40 to limit further pivoting movement.

Figure 3:
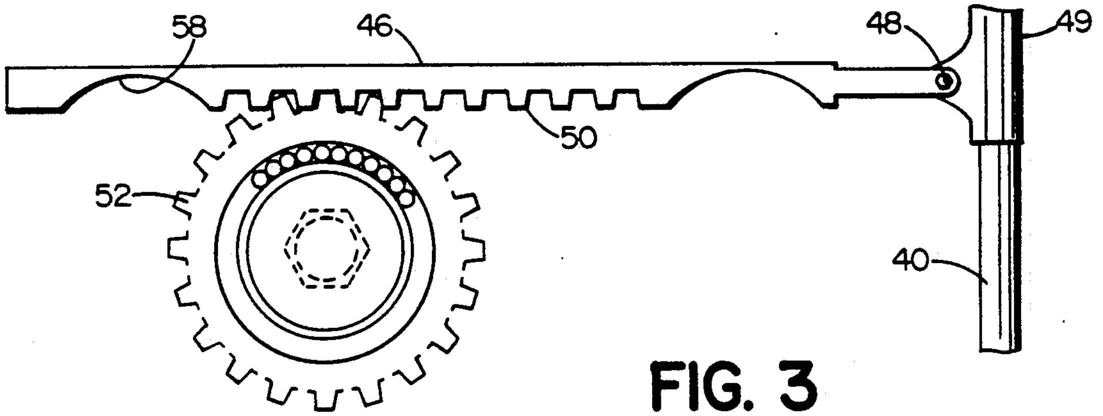
FIG. 3 is an enlarged fragmentary view illustrating the drive connection between the lever and the sprocket for propelling the wheelchair in a forward direction.

In accordance with the present invention, means are provided interconnecting each lever 40 and its associate drive sprocket 34. From a review of FIGS. 1 and 3, it will be appreciated that such interconnecting means may comprise an elongated rack 46 pivotally connected at its forward end at 48 to lever 40. Rack 46 includes a plurality of longitudinally spaced teeth 50 extending along its underside for a predetermined length or extent of rack 46. It will be appreciated that teeth 50 lie in meshing engagement with sprocket teeth 52 when the lever 40 is in position to propel the wheelchair in a forward direction, by backward and forward pivoting action of lever 40 about pivot point 42. With reference to FIG. 1, a bearing 54 is carried by side frame 13 on the opposite side of rack 46 from teeth 50 to maintain rack 46 in engagement with sprocket 34 throughout the full range of movement of rack 46 as explained below. Consequently, upon forward movement of lever 40 about pivot 42, the rack translates in a forward direction to rotate sprocket 34 in a direction to rotate drive wheels 16 through the clutch thereby to move the wheelchair forwardly. Upon the return stroke of lever 40 in a rearward direction, rack teeth 50 engage sprocket teeth 52 and the sprocket 34 rotates freely relative to wheel hub 22 through the clutch mechanism.

A significant feature of the present invention resides in the provision of one or more neutral or null positions along each rack 46 to disconnect the drive between the lever and drive wheel, while maintaining engagement of the rack and sprocket, and hence permit manual rotation of wheels 16 in either direction. To that end, rack 46 is provided along its underside with one or more arcuate extents or section 58 for smooth, non-driving engagement with the sprocket teeth 52. Consequently, when the arcuate extent 58 engages sprocket teeth 52, sprocket 34 is enabled to rotate in either direction relative to rack 46. Preferably, the arcuate extents 58 are provided at the opposite ends of rack 46 so that a neutral or null position at each of the ends of the power stroke and return stroke.

A further significant aspect of the present invention resides in the capability to change the speed of the wheelchair upon forward locomotion thereof, particularly to change the torque applied to the sprocket. To accomplish this, the location of the pivot connection 48 between rack 46 and lever 40 can be altered to change the length of the lever arm between pivot points 42 and 48. Thus, the forward end of the rack 46 may be pivotally secured to a tube 49 slidably received on lever 40. The tube can be disposed in selected adjusted positions along lever 40 by actuation of a spring-biased pin carried by lever 40 adjacent handle 44 in an area accessible to the individual seated in the wheelchair. Thus, by depressing the pin, tube 49 can be raised or lowered along lever 40 into selected adjusted positions to change the length of the arm between the pivot connection 48 of the rack 46 and lever 40 on the one hand, and the pivot connection 42 between lever 40 and the frame 12 on the other hand.

Referring now to the embodiment hereof illustrated in FIGS. 4–6, like numerals are applied to like parts as in the previous embodiment, followed by the letter suffix "a". In this embodiment, however, there is provided a chain drive interconnecting lever 40*a* and sprocket 34*a*. Particularly, chain 70 extends from its connection with lever 40*a* above the pivotal connection 42*a* of lever 40*a* and side frame 13*a*, about sprocket 34*a* and is connected at its opposite end to a coil spring 72. The coil spring 72 has one end connected to side frame 13*a*. By reciprocating lever 40*a* backwards and forwards on its power and return strokes, chain 70 rotates sprocket 34*a* on the power stroke in a direction to clutch drive wheel 16*a* to sprocket 34*a* and hence drive the wheelchair in a forward direction. It will be appreciated that by pivoting lever 40*a* in a forward direction, chain 70 is drawn about sprocket 34*a* against the bias of coil spring 72. Upon the return stroke, the coil spring maintains the chain 70 taut about sprocket 34*a*.

Referring now to FIG. 5, means for changing the speed of or torque applied to sprocket 34*a* and hence the speed of wheel 16*a* are provided. The pivotal connection 48*a* between the chain 70 and lever 40*a* is provided on a tube 49*a* slidable along lever 40*a*. Sleeve 49*a* extends upwardly to a position below handle 44*a*, accessible to the individual seated in the wheelchair. Vertically spaced openings are provided along the tube for receiving a spring-biased button or plunger mounted on lever 40*a*. Thus, the vertical position of tube 49*a* along lever 40*a* can be selectively adjusted, thereby shortening or lengthening the lever arm between pivot points 48*a* and 42*a*.

Referring now to FIG. 6, chain 70, similarly as rack 46 in the previous embodiment, is provided with at least one null or neutral position whereby the sprocket 34*a* may remain engaged with, but is drivingly disconnected from, chain 70. To accomplish this, the chain is provided with a predetermined extent thereof which is devoid of transversely extending pins 78. The extent of the chain void of pins 78 is at least equal to the extent of chain about sprocket 34*a* whereby, when the extent void of pins extends about sprocket 34*a*, sprocket 34*a* is rotatable in either direction relative to the chain. Preferably, the extent void of pins 78 of chain 70 is provided at one of the extreme ends of motion of lever 40*a*, i.e., in its forwardmost extreme as illustrated in FIG. 4. Consequently, when it is desired, for example, to disengage the lever propulsion system for the wheelchair, lever 40*a* is pivoted into its forwardmost position to align the extent of chain 70*a* void of pins 78 about sprocket 34*a*. It will be appreciated that the links on opposite sides of the chain may rest on shoulders on the sprocket or in grooves formed along opposite sides of the sprocket, both not shown, to maintain the chain in engagement with the sprocket. When the chain is so arranged about sprocket 34*a*, sprocket 34*a* is rotatable in either direction. Thus, upon disengagement of the lever propulsion system, the individual seated in the chair may use the push rims to move the chair in forwards or backwards directions or turn as desired.

Figure 7:
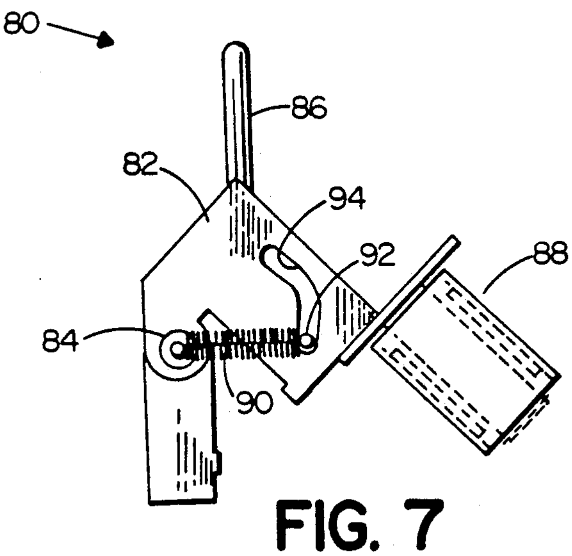
FIG. 7 is a schematic side elevational view of an anti-reversing brake illustrated in its raised non-braking position.
Figure 8:
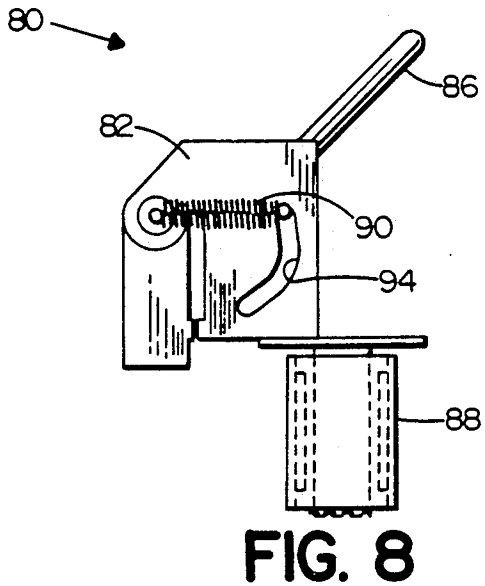
FIG. 8 is a view similar to FIG. 7 illustrating the brake in its lowered braking position.
Figure 9:
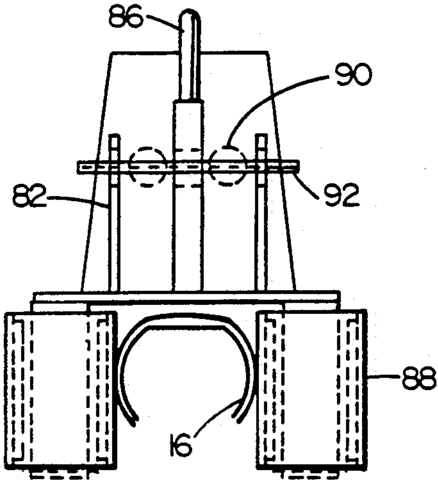
FIG. 9 is a cross-sectional view of the brake illustrated in FIG. 8 in braking engagement with the wheelchair tire.

Referring now to FIGS. 7, 8 and 9, there is also provided an anti-reversing device connected between the frame and the drive wheels which enables the wheelchair to move forwardly either manually using the push rims or by using the lever propulsion system, while at the same time preventing rearward movement of the wheelchair. While in a preferred embodiment, the anti-reversing device is included in the wheelchair hub, the present invention may also be applied to existing wheelchairs as an additionally added item. In such a case, and where the wheelchair hub is not anti-reversing, some sort of anti-reversing device is necessary. To accomplish this in one embodiment, there is mounted on frame 12 adjacent each side an anti-reversing device 80 comprising a frame 82 pivotally mounted at 84 to the wheelchair side frame 13. The frame 82 has a handle 86 to facilitate pivotal movement of frame 82 for reasons which will become clear. Frame 82 mounts a pair of clutch rollers spaced a distance apart from one another to receive the wheelchair tire therebetween. The clutch rollers are one-way clutches which enable the wheelchair tire to rotate in a direction to permit forward movement of the weak wheelchair but prevent rearward movement of the wheelchair tire. That is, the roller clutches 88 straddle wheel 16 and frictionally engage its tire. Roller clutches 88 free-wheel in opposite directions, thus permitting the wheelchair to move forwardly but frictionally braking the tire upon reverse movement.

When it is desired to move the wheelchair in a rearward direction, the individual may grasp handle 86 and pivot bracket 82 and roller clutches 88 from their engagement with the wheelchair tire, thereby releasing the wheel for rearward movement of the wheelchair. The bracket may be maintained in either the tire-engaging position or non-engaging position spaced from the tire by a pair of over-center springs 90 connected between the pivot point 84 and a pin 92 disposed in arcuate slots 94 in base 82. Consequently, when rotating the base 82 between the tire-engaging and tire-disengaged positions, the springs move over-center, biasing the bracket and roller clutches into the desired position.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, one embodiment of the present invention would be a children's toy having two drive wheels and a single steerable or casterable front wheel. Steering would be by means of the steerable front wheel or by differential driving of the drive wheels. In view of the above specification, many variations and modification of the present invention will be apparent to those skilled in the art. Therefore, the invention is limited only by the appended claims.

What is claimed is:

1. A manually-propelled device comprising:
a frame having a seat for supporting an individual;
means supporting said frame for locomotion of said device including a pair of wheels carried by said frame adjacent opposite sides thereof;
means for mounting said wheels for rotation relative to said frame; and
means carried by said frame and operable by the individual seated in the device for propelling said device in a forward direction, including at least one lever pivotally connected to said frame, a rotatable drive sprocket carried by said frame for rotating at least one of said wheels in a direction to propel the device in a forward direction, and means interconnecting said lever and said sprocket for rotating said drive sprocket to propel the device in the forward direction;
said interconnecting means including an element movable through two positions relative to and in engagement with said sprocket, said element in said first position thereof relative to said sprocket engaging and driving said sprocket, said element in said second position thereof relative to said sprocket engaging said sprocket in non-driving relation thereto thereby disconnecting the drive connection between said lever and said sprocket and freeing said one wheel for rotation.

2. A device according to claim 1 comprising a wheelchair, including means carried by said lever and cooperable with said element to selectively vary the torque applied to said sprocket by pivoting said lever.

3. A wheelchair according to claim 2 wherein said lever upstands from its pivotal connection with said frame and has a handle accessible by the individual seated in the wheelchair for pivoting said lever and propelling the wheelchair in the forward direction, said torque varying means including means located adjacent said handle for selecting the torque applied to said sprocket.

4. A device according to claim 1 comprising a wheelchair, wherein the propelling means includes a second lever pivotally connected to said frame, a second rotatable drive sprocket carried by said frame for rotating the other of said pair of wheels in one direction to propel the wheelchair in a forward direction and means interconnecting said second lever and said second sprocket for rotating said second sprocket to propel the wheelchair in the forward direction, the latter interconnecting means including a second element movable through two positions relative to and in engagement with said second sprocket, said second element in said first position thereof relative to said second sprocket engaging and driving said second sprocket, said second element in said second position thereof relative to said second sprocket engaging said second sprocket in non-driving relation thereto thereby disconnecting the drive connection between said second lever and said second sprocket and freeing said one wheel for rotation.

5. A manually-propelled wheeled device comprising:
a frame having a seat for supporting an individual;
means supporting said frame for locomotion of said device including a pair of wheels carried by said frame adjacent opposite sides thereof;
means for mounting said wheels for rotation relative to said frame; and
means carried by said frame and operable by the individual seated in the device for propelling said device in a forward direction, including at least one lever pivotally connected to said frame, a rotatable drive sprocket carried by said frame for rotating at least one of said wheels in a direction to propel the wheelchair in a forward direction, and means interconnecting said lever and said sprocket for rotating said drive sprocket to propel the device in the forward direction;
said interconnecting means including an elongated rack connected to said lever for substantially translational movement in response to pivotal movement of said lever and carrying a plurality of teeth, said teeth in a first position of said rack relative to said sprocket engaging and driving said sprocket in response to pivoting said lever and translating said rack to propel the device in the forward direction, said rack in a second position relative to and in engagement with said sprocket enabling non-driving relative movement between said sprocket and said rack, thereby disconnecting the drive connection between said lever and said sprocket and freeing said one wheel for rotation to move the device in a rearward direction.

6. A device according to claim 5 comprising a wheelchair, wherein said rack carries said plurality of teeth along a first predetermined extent thereof for engaging and driving said sprocket in said first relative position of said rack and said sprocket, said rack having a second extent thereof void of teeth for enabling non-driving relative movement between said sprocket and said rack in said second relative position thereof.

7. A wheelchair according to claim 6 wherein said rack extends linearly, said interconnecting means including means pivotally mounting said rack and said lever one to the other at a location spaced from the pivotal connection of said lever and said frame.

8. A wheelchair according to claim 7 including means for maintaining said rack and said sprocket in engagement with one another in both said first and second positions of said rack and said sprocket relative to one another.

9. A device according to claim 5 comprising a wheelchair, including means carried by said lever and cooperable with said rack to selectively vary the torque applied to said sprocket by pivoting said lever.

10. A wheelchair according to claim 9 wherein said lever upstands from its pivotal connection with said frame and has a handle accessible by the individual seated in the wheelchair for pivoting said lever and propelling the wheelchair in the forward direction, said torque varying means including means located adjacent said handle for selecting the torque applied to said sprocket.

11. A device according to claim 5 comprising a wheelchair, wherein said propelling means includes a second lever pivotally connected to said frame, a second rotatable drive sprocket carried by said frame for rotating the other of said pair of wheels in one direction to propel the wheelchair in a forward direction and means interconnecting said second lever and said second sprocket for rotating said second sprocket to propel the wheelchair in the forward direction, the latter interconnecting means including a second elongated rack connected to said lever for substantially translational movement in response to pivotal movement of said second lever and carrying a plurality of teeth, the teeth of said second rack in a first position relative to said second sprocket engaging and driving said second sprocket in response to pivoting said second lever and translating said second rack to propel the wheelchair in a forward direction, said second rack in a second position relative to said second sprocket enabling non-driving relative movement between said second sprocket and said second rack, thereby disconnecting the drive connection between said second lever and said second sprocket and freeing said second wheel for rotation in a direction enabling the wheelchair to move in a rearward direction.

12. A device according to claim 5 comprising a wheelchair, including means carried by said frame for selective engagement with said one wheel for preventing movement thereof in a direction to permit movement of the wheelchair in a reverse direction.

13. A device for improving the propulsion of rim-propelled wheelchairs, said wheelchair including: a wheelchair frame having a seat for supporting an individual; means supporting said frame for locomotion of said wheelchair including a pair of wheels carried by said frame adjacent opposite sides thereof; and means for mounting said wheels for rotation relative to said frame;

said device mounted on said frame and operable by the individual seated in the wheelchair for propelling said wheelchair in a forward direction, including:

at least one lever pivotally connected to said frame, a rotatable drive sprocket carried by said frame for rotating at least one of said wheels in a direction to propel the wheelchair in a forward direction;

means interconnecting said lever and said sprocket for rotating said drive sprocket to propel the wheelchair in the forward direction, said interconnecting means including an element movable through two positions relative to and in engagement with said sprocket, said element in said first position thereof relative to said sprocket engaging and driving said sprocket, said element in said second position thereof relative to said sprocket engaging said sprocket in non-driving relation thereto thereby disconnecting the drive connection between said lever and said sprocket and freeing said one wheel for rotation; and anti-reversing means, attachable to said wheelchair frame, movable between first and second operative positions, said first operative position comprising frictional engagement with said drive wheels and said anti-reversing means comprising a means for preventing rearward movement of said wheelchair, said second operative position comprising a non-engagement position with respect to said wheelchair drive wheel.

* * * * *